미국009153390B2

United States Patent
Lammers et al.

(10) Patent No.: US 9,153,390 B2
(45) Date of Patent: Oct. 6, 2015

(54) SWITCH ARRANGEMENT FOR AN ELECTRICAL SWITCHGEAR

(75) Inventors: Arend Lammers, Hengelo (NL); Marten Binnendijk, Hengelo (NL)

(73) Assignee: EATON INDUSTRIES (NETHERLANDS) B.V., Hengelo (NL)

( * ) Notice: Subject to any disclaimer, the term of this patent is extended or adjusted under 35 U.S.C. 154(b) by 214 days.

(21) Appl. No.: 13/581,889

(22) PCT Filed: Mar. 1, 2011

(86) PCT No.: PCT/EP2011/000994
§ 371 (c)(1),
(2), (4) Date: Nov. 13, 2012

(87) PCT Pub. No.: WO2011/107255
PCT Pub. Date: Sep. 9, 2011

(65) Prior Publication Data
US 2013/0048478 A1  Feb. 28, 2013

(30) Foreign Application Priority Data

Mar. 1, 2010 (EP) ..................... 10002053
Mar. 1, 2010 (EP) ..................... 10002054
Mar. 1, 2010 (EP) ..................... 10002055

(51) Int. Cl.
*H01H 9/00* (2006.01)
*H02B 11/00* (2006.01)
*H01H 1/40* (2006.01)
*H02B 11/04* (2006.01)
*H02B 11/28* (2006.01)
*H01H 1/36* (2006.01)
*H01H 33/662* (2006.01)

(52) U.S. Cl.
CPC ................ *H01H 1/40* (2013.01); *H02B 11/04* (2013.01); *H02B 11/28* (2013.01); *H01H 1/365* (2013.01); *H01H 33/662* (2013.01)

(58) Field of Classification Search
CPC ........... H01H 3/20; H01H 15/00; H01H 3/00; H01H 3/02; H01H 3/001; H01H 3/3031; H01H 3/3042; H01H 3/32; H01H 3/38; H01H 3/54; H01H 9/0044; H01H 69/00; H01H 71/00; H01H 71/02; H01H 71/0214; H01H 71/025; H01H 71/0264; H01H 71/0271; H01H 71/10; H01H 71/1072; H01H 71/128; H01H 71/50; H01H 71/52; H01H 71/521; H01H 71/522; H01H 71/523; H01H 71/524; H01H 73/06; H01H 73/24; H01H 73/38; H01H 73/50; H01H 73/60
USPC ............. 200/5 B, 43.16, 50.16, 50.17, 50.21, 200/50.24, 50.27, 50.3, 50.32, 50.39, 50.4, 200/431, 318, 318.1, 320, 324
See application file for complete search history.

(56) References Cited

U.S. PATENT DOCUMENTS 3,899,722 A * 8/1975 Cadez et al. .................. 361/606
2010/0033907 A1* 2/2010 Baird et al. ................... 361/624

FOREIGN PATENT DOCUMENTS

DE  4445172 A1  6/1996

OTHER PUBLICATIONS

European Patent Office, International Search Report in International Patent Application No. PCT/EP2011/000994 (Jun. 30, 2011).

*Primary Examiner* — Edwin A. Leon
*Assistant Examiner* — Anthony R. Jimenez
(74) *Attorney, Agent, or Firm* — Leydig, Voit & Mayer, Ltd.

(57) ABSTRACT

A switch arrangement for an electrical switchgear includes: a terminal arrangement including an insulating housing, the insulating housing including a first electrical contact and a second electrical contact which are spaced apart along an axial direction; and a breaker moveable along the axial direction in the housing to a first position. When the breaker is in the first position and closed it electrically connects the first electrical contact and the second electrical contact. The insulating housing is split into a plurality of separate sections along the axial direction. At least one of the electrical contacts is in a first section and at least another of the electrical contacts is in a second section.

15 Claims, 9 Drawing Sheets

SWITCH ARRANGEMENT FOR AN ELECTRICAL SWITCHGEAR

CROSS-REFERENCE TO RELATED APPLICATIONS

This patent application is a national stage entry under 35 U.S.C. §371 of International Application No. PCT/EP2011/000994, filed Mar. 1, 2011, and claims priority to European Patent Application No. EP 10002055.1, filed Mar. 1, 2010, European Patent Application No. EP 10002054.4, filed Mar. 1, 2010, and European Patent Application No. EP 10002053.6, filed Mar. 1, 2010. The International Application was published in English on Sep. 9, 2011, as WO 2011/107255 A1.

FIELD

The present invention relates to a switch arrangement for electrical switchgear.

BACKGROUND

A switchgear is an integrated assembly of switches, buses fuses and other components used to isolate electrical equipment at an electrical installation, for example, an electrical power sub-station. Switchgear is used to both de-energise equipment to allow work to be done and to clear faults downstream of the switchgear. Switchgear is often housed in a metal cabinet at the installation.

A distinction is made between so called 'fixed switchgear' and so called 'withdrawable switchgear'. In fixed switchgear the main circuit breaker is fastened within the installation by fasteners, for example bolts, and cannot be removed from the installation without using tools to undo the fasteners. In withdrawable switchgear additional constructional features enable the main circuit breaker to be withdrawn from the installation (and put back in) with a minimum usage of tools or with no usage of tools. Accordingly, in a withdrawable switchgear, the main circuit breaker can be removed quickly for maintenance or replacement or to provide easy access to other components in the installation.

FIG. 5 is a schematic illustration of a conventional withdrawable switchgear 30 comprising, a circuit breaker 31 comprising a first breaker contact 31a and second breaker contact 31b, and a cabinet 32 containing busbars 33. The switchgear 30 further comprises a first terminal 34 and a second terminal 35 each comprising a respective electrically insulating housing 34a and 35a. The insulating housing 34a contains an electrical contact 34b connected to a busbar 33 and the insulating housing 35a contains an electrical contact 35b connected to a cable connection 36 which is for connecting to a cable (not shown) routed to a load (not shown).

In FIG. 5, the circuit breaker is shown in the withdrawn position in which there is no electrical connection between the busbar 33 and the load (not shown). In a service position, the breaker 31 is located in the cabinet 32 with the first breaker contact 31a inserted into the first housing 34a engaging the contact 34b and the second breaker contact 31b is inserted into the second housing 35 engaging the contact 35b. In this way, when the breaker is closed (e.g. not tripped) an electrical connection exists between the busbar 33 and the load (not shown) through the breaker 31. This configuration is not compact.

U.S. Pat. No. 3,889,722 describes a plastic insulated switching unit for a multiphase high voltage switchgear. The switching unit comprises an insulating housing defining a cylindrical cavity and fixed ring-shaped contacts at an inside wall of said housing. A drawout switching device comprises a projecting tubular pole, having an operating mechanism. The tubular pole comprises ring-shaped contact pieces mounted on its outside. The switching device is moveable between a fully inserted position and an isolating position. In U.S. Pat. No. 3,889,722 the fixed ring-shaped contacts are each located in a first recess formed in the inner surface of the insulating housing.

SUMMARY

It is desirable to provide an improved switch arrangement for an electrical switchgear and in particular an assembly that allows for a compact, more space efficient switchgear with a low number of components.

An embodiment of the present invention provides a switch arrangement for an electrical switchgear. The switch arrangement includes: a terminal arrangement including an insulating housing, the insulating housing including a first electrical contact and a second electrical contact which are spaced apart along an axial direction; and a breaker moveable along the axial direction in the housing to a first position. When the breaker is in the first position and closed it electrically connects the first electrical contact and the second electrical contact. The insulating housing is split into a plurality of separate sections along the axial direction. At least one of the electrical contacts is in a first section and at least another of the electrical contacts is in a second section.

BRIEF DESCRIPTION OF THE DRAWINGS

The invention will be described in more detail below, with reference to the accompanying drawings.

DETAILED DESCRIPTION

According to an embodiment of the invention, there is provided a switch arrangement for an electrical switchgear. The housing may be split into two or a plurality of separate sections along the axial direction, with one of the electrical contacts in one of the sections and the other (of the) electrical contact(s) in another (of the) section(s).

Splitting the housing into a plurality of separate sections facilitates maintenance of the switchgear. For example, this permits for easier access to the contacts and also creates a gap for a screen or shutters to be drawn into to physically isolate a contact during maintenance.

The breaker is moveable along the axial direction in the housing to a first position, wherein, when the breaker is in the first position and closed it electrically connects the first electrical contact and the second electrical contact. Advantageously, the breaker may be moveable to a second position in which it is withdrawn from the switchgear.

In a preferred embodiment, the first electrical contact is for a bus and the second electrical contact is for a load connection.

In still another embodiment, the housing comprises a third electrical contact spaced apart from the first and second electrical contacts along the axial direction, wherein, the third electrical contact is for ground, and wherein the breaker is moveable to a third position and wherein, when the breaker is in the third position and closed it electrically connects the second electrical contact and the third electrical contact (7) and the first electrical contact (5) is isolated.

Figure 1A:
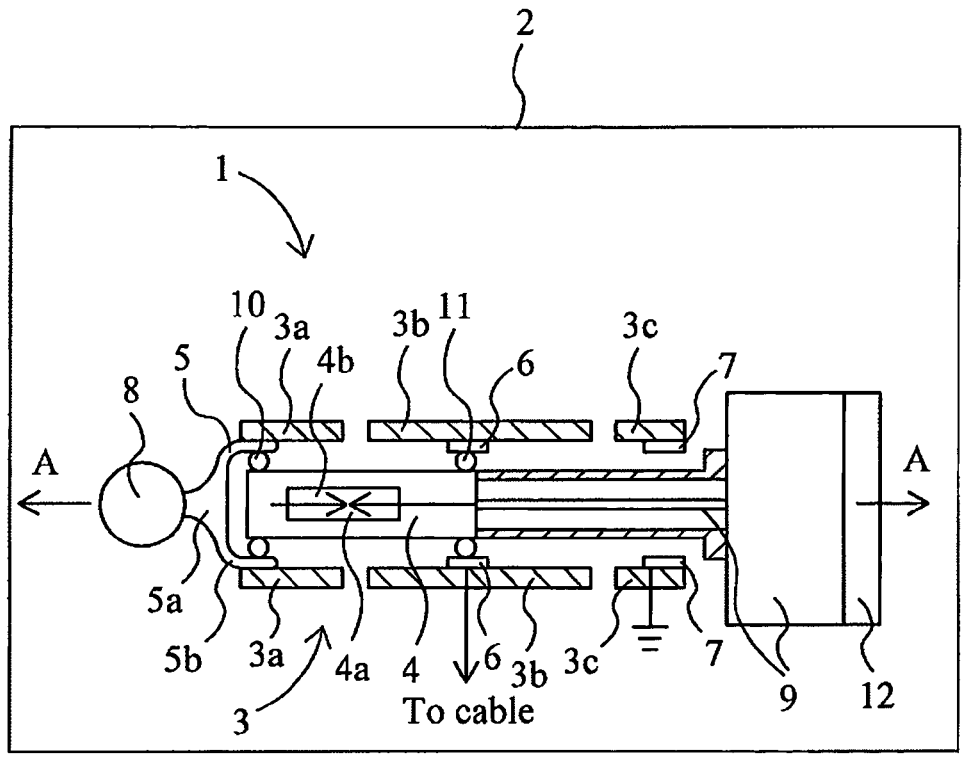
FIG. 1a is a schematic illustration of a side sectional view of a switch arrangement with a circuit breaker in a first position.
Figure 1B:
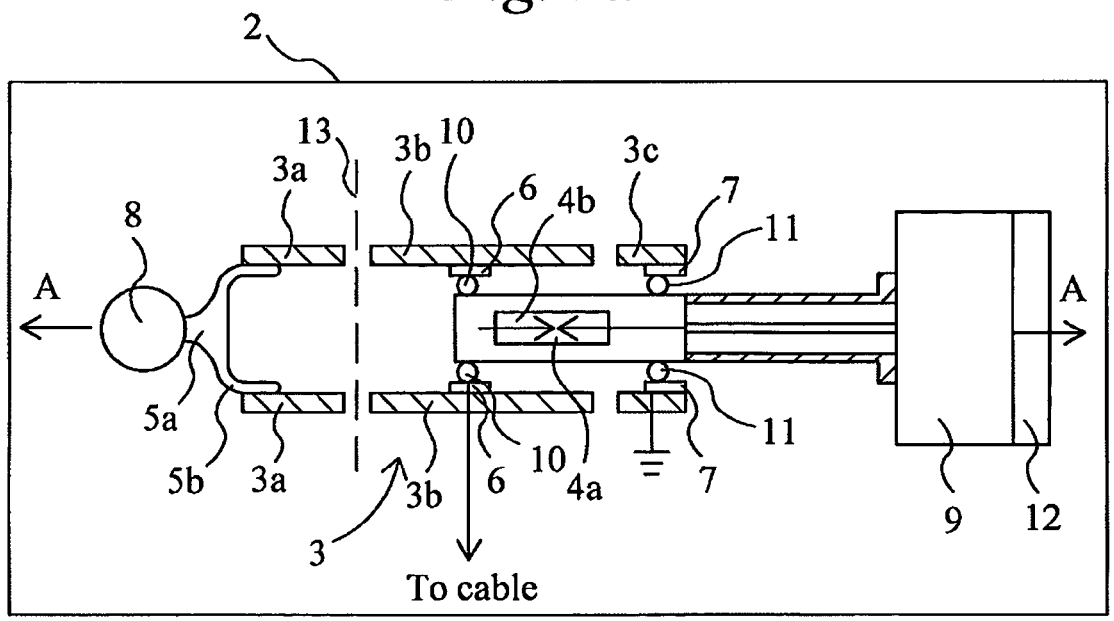
FIG. 1b is a schematic illustration of a side sectional view of the switch arrangement with the circuit breaker in a second position.
Figure 1C:
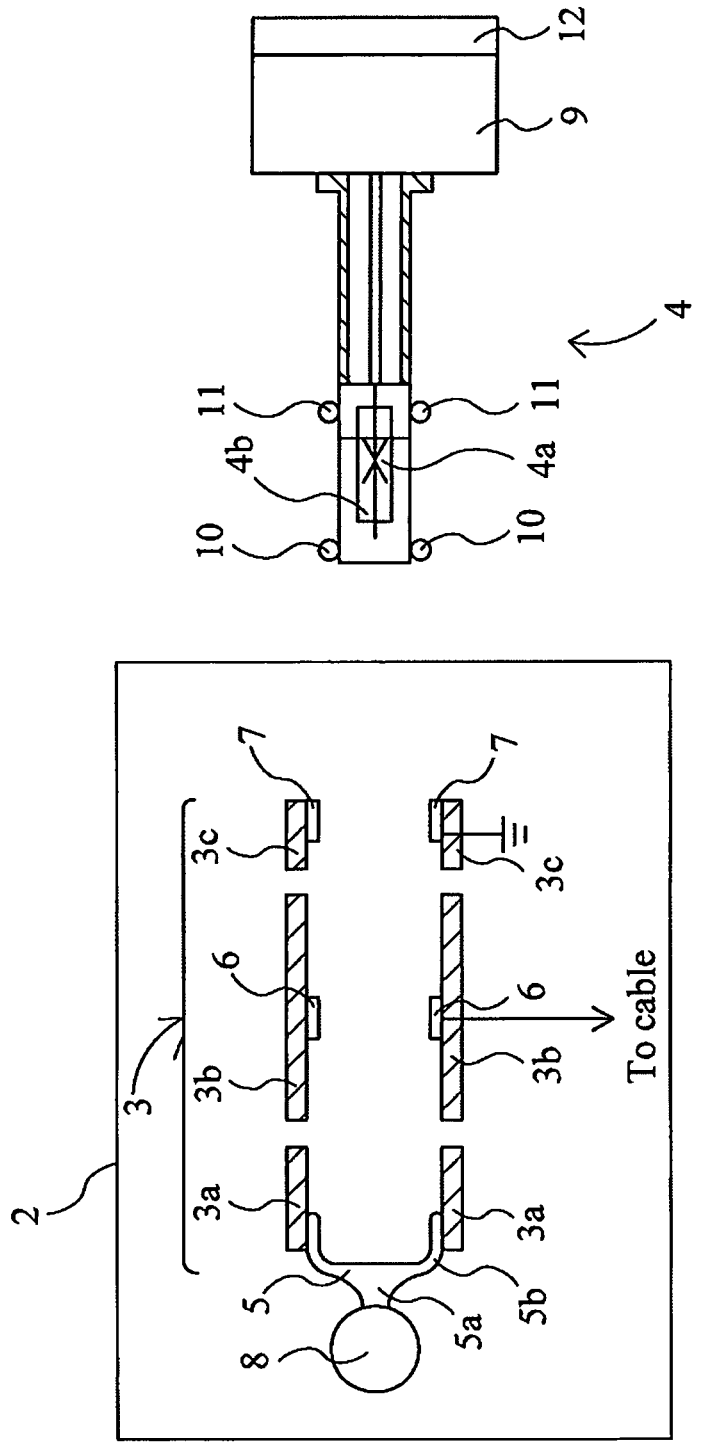
FIG. 1c is a schematic illustration of a sectional view of the switch arrangement with the circuit breaker in a third position.

Referring to FIGS. 1a to 1c, a switch arrangement 1 for an electrical switchgear 2 comprises an electrical pole or terminal 3 and a circuit breaker 4. The terminal 3, is fixed within the switchgear 2 and comprises a housing made up of first 3a, second 3b and third 3c electrically insulating tubular sections of substantially equal diameter which are spaced apart lengthwise along a common axis A. The three tubular sections may for example be formed of an epoxy resin material. Each of the three tubular sections 3a, 3b and 3c has a respective electrical contact 5, 6, 7 located inside of it. The first section 3a has a bus bar contact 5 for making an electrical connection to an electrical bus 8 of the switchgear 2, the second section 3b has a cable contact 6 for making an electrical connection to a cable of the switch gear 2 and onwards to a load and the third section 3a comprises a ground contact 7 for making an electrical connection to ground. In this example, the conductive contacts 5, 6, 7 are formed of metal, preferably copper, with the cable contact 6 and the ground contact 7 being ring shaped and arranged around the respective inner surfaces of the second 3b and third 3c insulating sections, and the bus bar contact 5 being cup shaped and having a base 5a connected to the bus-bar 8 and a side 5b arranged around the inner surface of the first insulating section 3a.

The circuit breaker 4, which may be a vacuum interrupter, is preferably generally cylindrical in shape, and is arranged lengthwise along the axis A and is moveable in and out of the inside of the terminal 3. If the breaker 4 is a vacuum interrupter, as is standard with such devices, it comprises two internal electrical contacts 4a, enclosed in a vacuum chamber 4b, one fixed and the other moveable and a breaker actuator assembly 9 for moving the moveable contact away from the fixed contact to open (i.e. trip) the breaker 4 in the event of a fault (e.g. an over current) being detected.

In this embodiment, the circuit breaker 4 further comprises at its respective ends, first 10 and second 11 external electrical contacts, each of which is preferably a ring shaped metal (e.g. copper) coil located in a respective annular groove that extends around an external diameter of the breaker 4, although different arrangements of contacts are also possible, for example, pad shaped contacts.

The switch arrangement 1 further comprises a powered drive mechanism 12 for causing linear movement of the circuit breaker 4, in the terminal 3, between a first position illustrated in FIG. 1a and a second position shown in FIG. 1b.

Figure 2D:
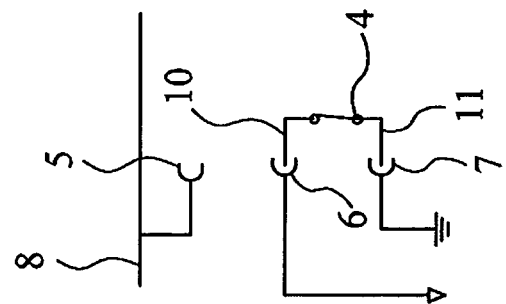
FIGS. 2a to 2d are circuit diagrams of the switch arrangement in various switch configurations.

In the first position, the first contact 10 slideably engages the bus-bar contact 5 and the second contact 11 slideably engages the cable contact 6. Accordingly, as illustrated in the circuit diagram of FIG. 2a, when the circuit breaker 4 is in the first position and is closed (i.e. the internal contacts 4a are closed) the bus-bar 8 is electrically connected via the breaker 4 to the cable contact 6 so that the switch gear arrangement 1 can supply power to a load. As illustrated in FIG. 2b, when the circuit breaker 4 is in the first position but it is open (i.e. the internal contacts 4a are open) the bus-bar 8 is electrically disconnected by the breaker 4 from the cable contact 6 and the switch gear arrangement 1 cannot supply power to the load (not shown).

In the second position, the first contact 10 slideably engages the cable contact 6 and the second contact 11 slideable engages the ground contact 7. Accordingly, as illustrated in the circuit diagram of FIG. 2c, when the circuit breaker 4 is in the second position and is open, the cable contact 6 is electrically disconnected from the bus-bar 8 and from the ground contact 7. As illustrated in FIG. 2d, when the circuit breaker 4 is in the second position but is closed, the cable contact 6 is electrically disconnected from the bus-bar 8, but is electrically connected to ground via the circuit breaker 4. In one or other of these configurations of the second position, maintenance or testing of components can be performed.

FIG. 1c illustrates the circuit breaker 4 in a third position in which it is withdrawn from the switch gear arrangement 1. The circuit breaker 4 may be driven between this position and the second position along the axis A by the drive mechanism 12. Alternatively, the circuit breaker 4 and the drive mechanism 12 may be constructed as an integrated unit, which a human operator can manipulate manually between the second and third positions or can be power driven between the second and third positions.

Optionally, a shutter 13 is provided, which can be drawn into the position shown in FIG. 1b, as a physical barrier between the bus bar contact 5 and the breaker 4, so that tests can be performed on the breaker.

The housing may be transparent to allow for easy visible inspection of components.

Figure 3A:
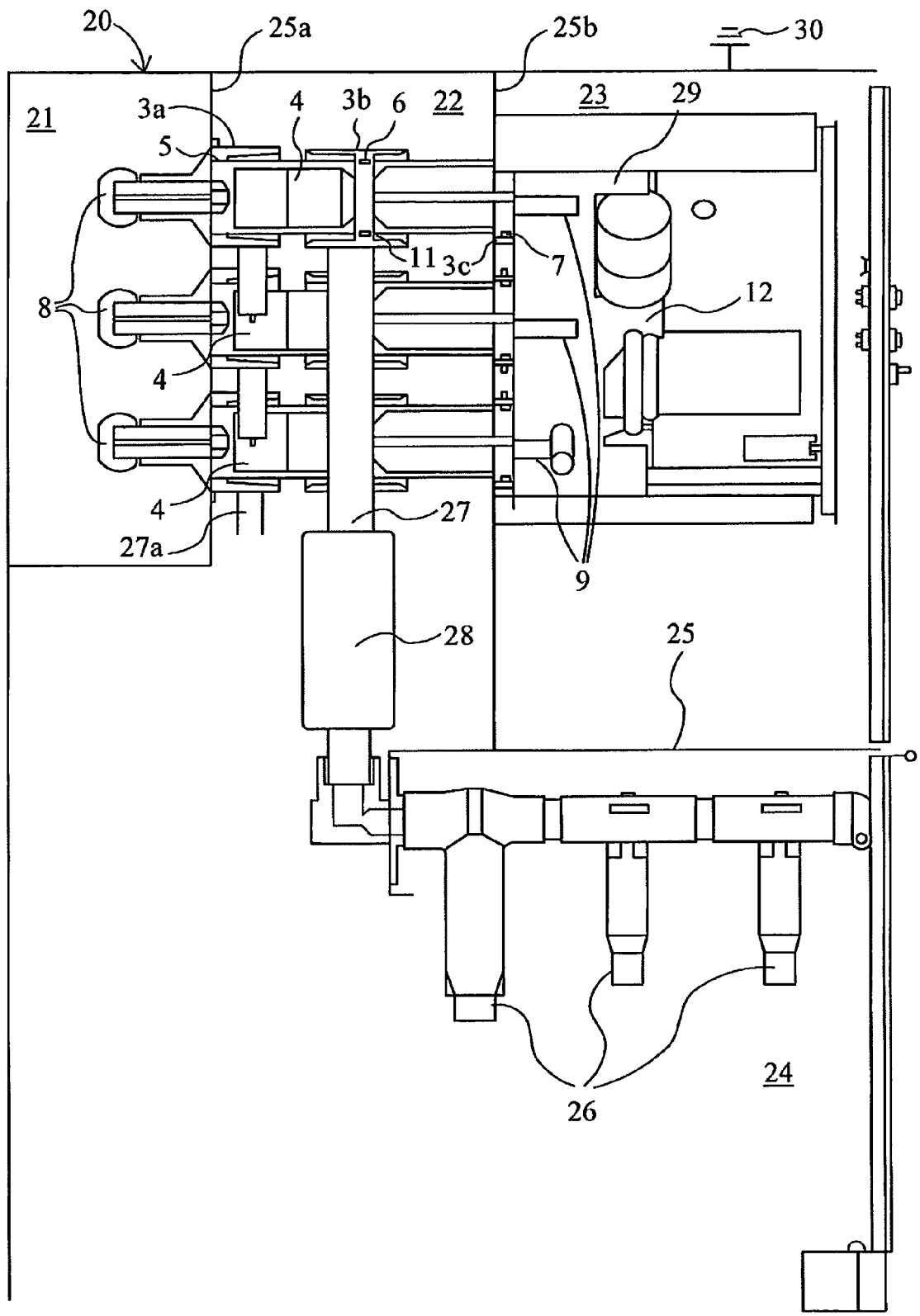
FIG. 3a is a side view of the inside of an electrical switchgear comprising a switch arrangement with a circuit breaker shown in a first position.
Figure 3B:
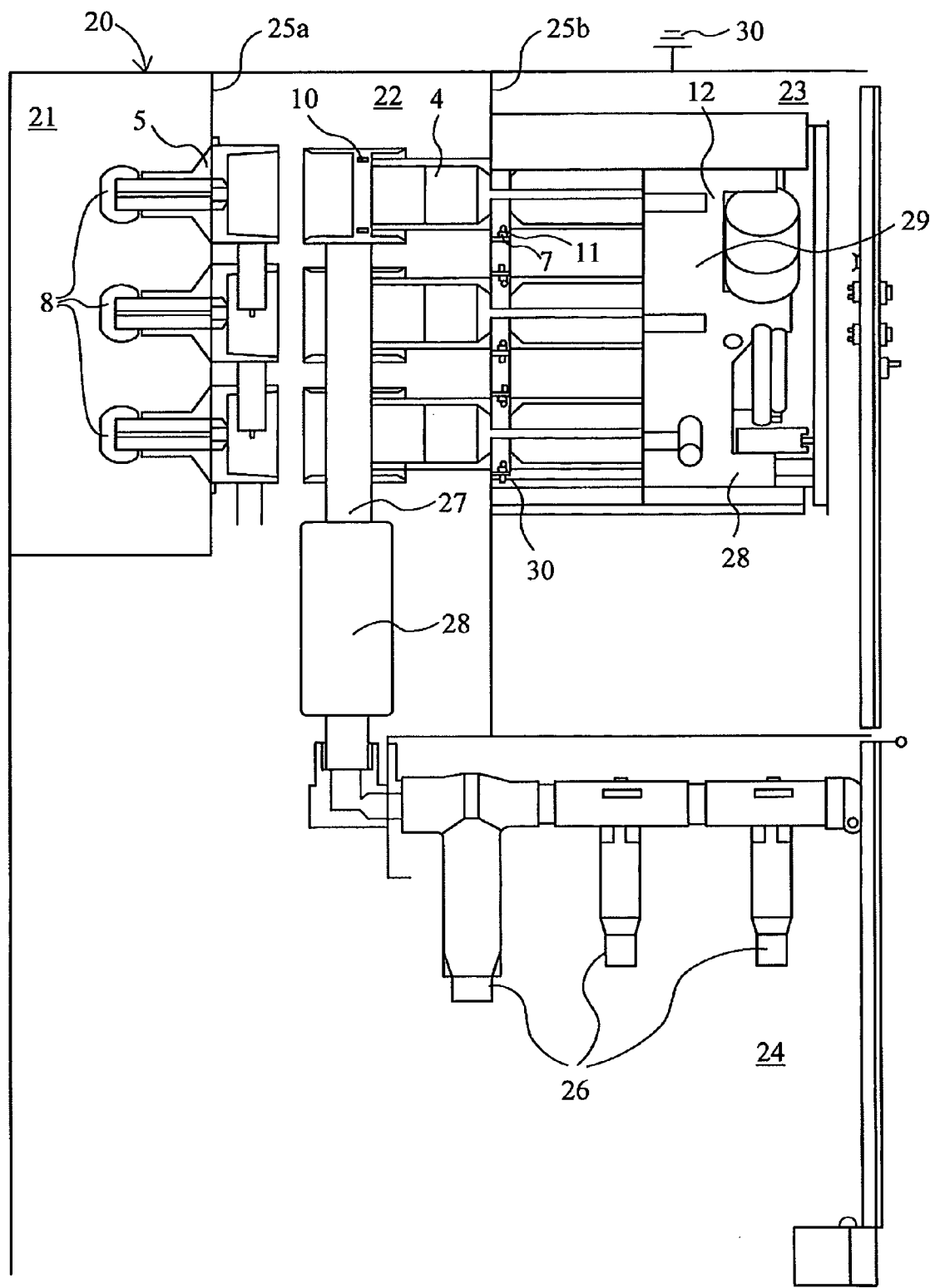
FIG. 3b is a side view of the inside of the electrical switchgear comprising the switch arrangement with the circuit breaker shown in a second position.
Figure 3C:
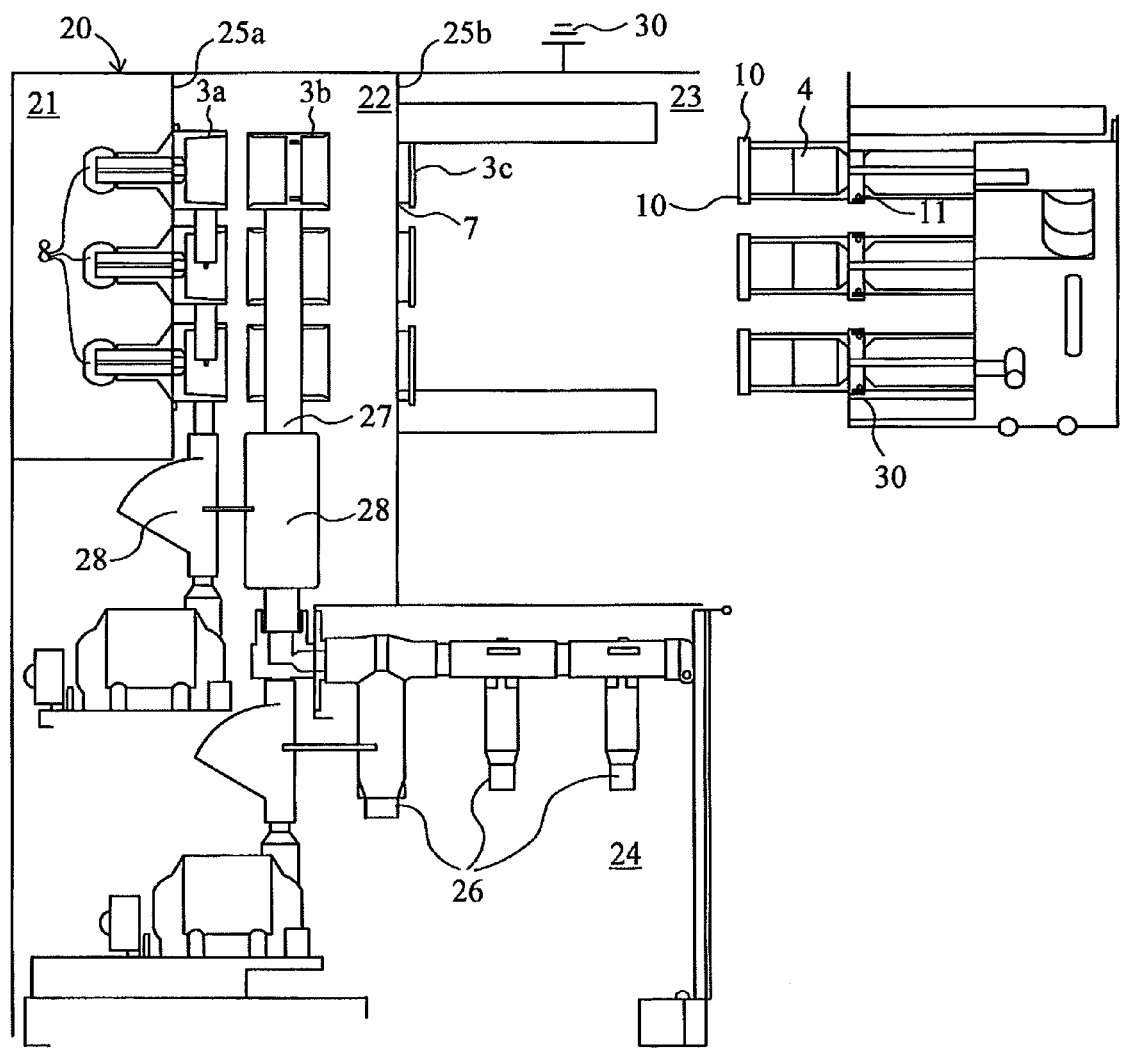
FIG. 3c is a side view of the inside of the electrical switch gear comprising the switch arrangement with the circuit breaker shown in a third position.
Figure 3D:
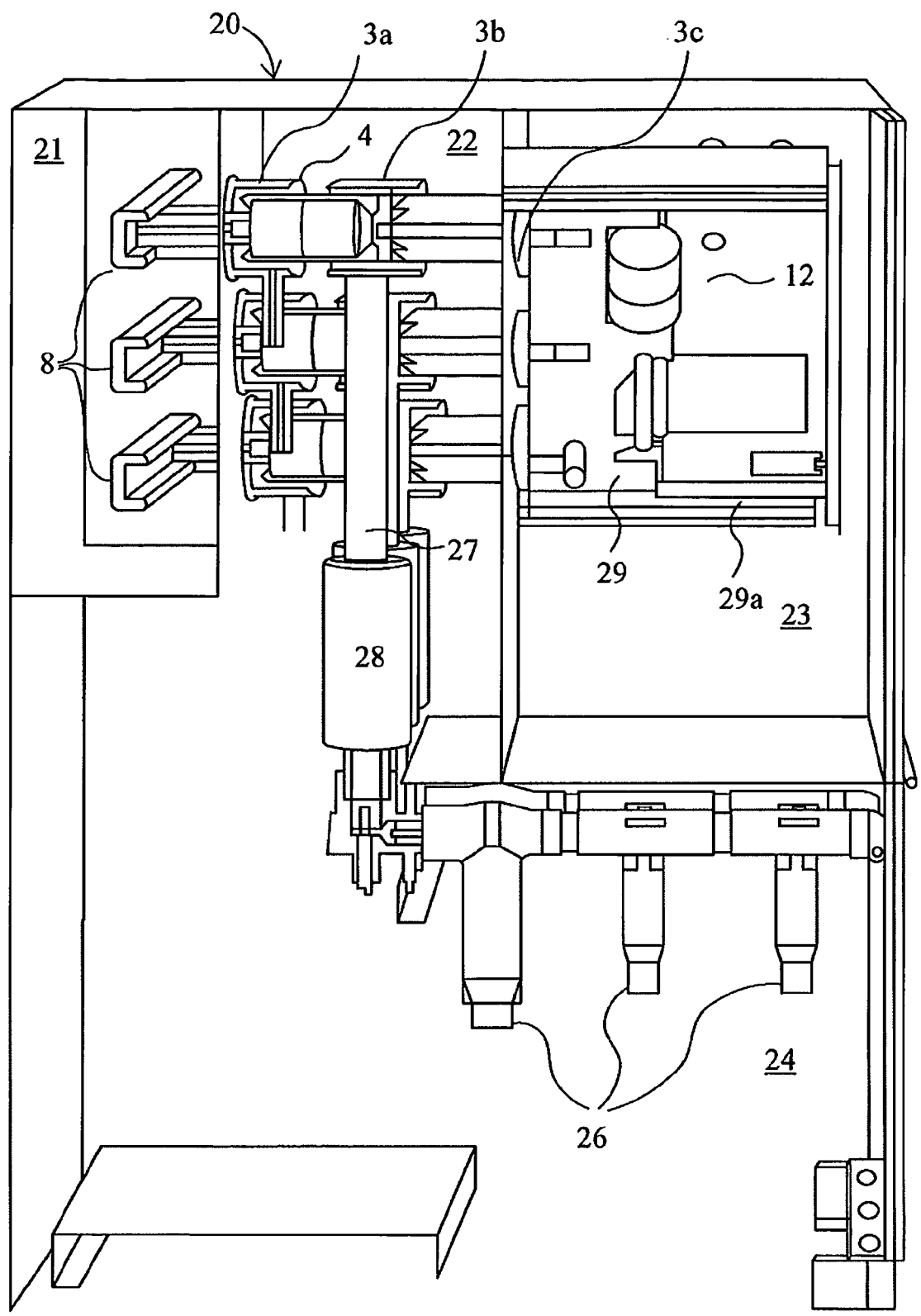
FIG. 3d is a perspective view of the inside of the electrical switchgear.

FIGS. 3a to 3c illustrate a side view of the inside of a cabinet 20, housing a medium voltage electrical switchgear 2 embodying the present invention. FIG. 3d illustrates a perspective view of the inside of the cabinet 20. Features the same as those already described with respect to FIGS. 1a to 1c are given the same reference numerals in FIGS. 3a to 3d as they are in FIGS. 1a to 1c.

The cabinet 20 is divided by internal partitions 25 into a plurality of compartments 21 to 24 containing the internal components of the switchgear 2. The switchgear 2 is a three-phase system and so comprises three conductive busbars 8 in an upper rearward section 21.

Figure 2C:
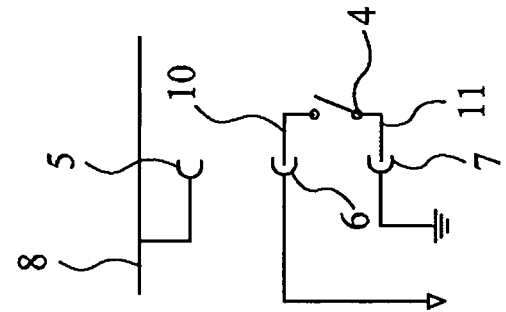
Figure 2B:
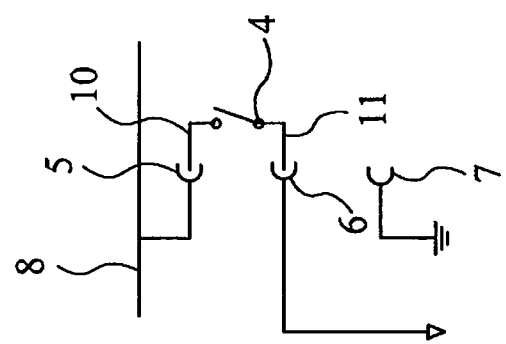
Figure 2A:
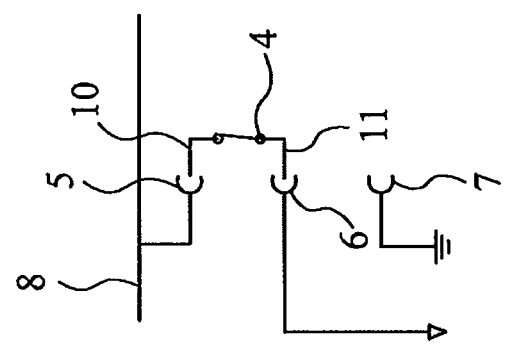

Each busbar 8 is provided with a terminal 3, of the type illustrated in FIGS. 2a to 2c, which extends from the upper rearward compartment 21, across an upper middle compartment 22, to an upper forward compartment 23. A circuit breaker 4, also of the type illustrated in FIGS. 2a to 2c, is associated with each terminal 3. As shown in the Figures, each terminal's 3 first tubular section 3a is partly in the upper rearward compartment 21 and partly in the upper middle compartment 22 and extends through the partition 25a which divides these two compartments; each terminal's 3 second tubular section 3b is supported in the upper middle compartment 22; and each terminal's 3 third tubular section 3c is in the upper forward section 23 and defines an aperture (best seen in FIG. 3c) through the partition 25b separating the upper forward section 23 and the upper middle section 22.

A bottom compartment 24 contains three groups of three cable terminations 26 (only one group of the three is visible in FIGS. 3a to 3c) which are connectable to cables (not shown) routed to a load (not shown). Each group of three cable terminations 26 is connected to a respective one of three conductors 27, which is routed to a cable contact 6 of a respective one of the terminals 3. Each conductor 27 may be fitted with measuring equipment 28, for example, a current transformer, voltage transformer or other such device.

A drive means 12 for driving each circuit breaker 4 between the first position illustrated in FIG. 3a (and FIG. 1a) and the second position illustrated in FIG. 3b (and FIG. 2b) is contained in the upper forward compartment 23. In this embodiment, the drive means 12 comprises a power driven carrier unit 29 mounted on a rail system 29a (see FIG. 3d) which supports the breakers 4, and is driven back and forth on the rail system to move the breakers 4, in unison, between the first and second positions. As explained above, the movement of the breakers 4 is substantially linear.

In the first position, each bus bar 8 is connected to a respective one of the three groups of cable termination 26 via a bus bar contact 5, a breaker 4, a cable contact 6 and a conductor 27. In the second position, each group of three cable termination 26 is connected to a ground connection via a respective conductor 27, a respective cable contact 6, a respective breaker 4, and a respective ground contact 7. The ground contact 7 is connected to the ground connection 30 via partition 25b and the metal cabinet 20.

FIG. 3c illustrates the third position in which the breakers 4 are withdrawn from the switch gear assembly. In this embodiment, the breakers 4 and the drive means 12 form an integrated unit which is easily removeable from the switchgear 2.

As is best seen in FIG. 3d, preferably, the terminals 3 are arranged in parallel within the cabinet 20 diagonally relative to the sides of the cabinet, with the breakers 4 correspondingly arranged. This provides for a more compact arrangement than could be achieved by arranging the terminals 3 and breakers 4 horizontally or vertically.

Figure 4A:
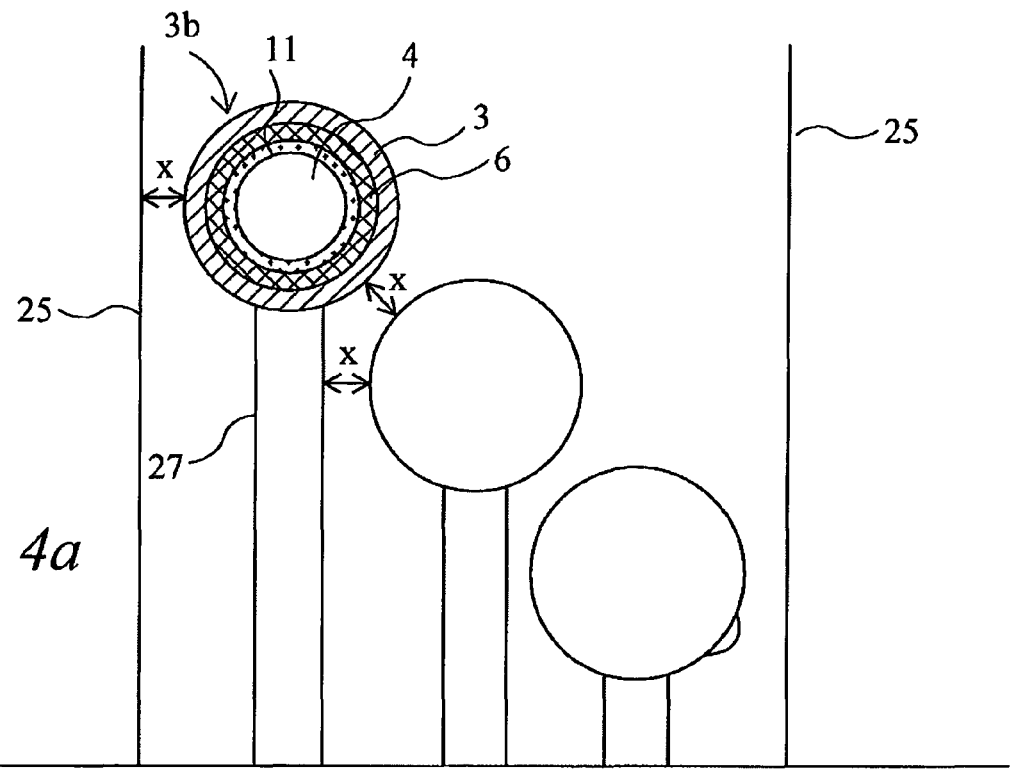
FIG. 4a is a schematic front view of the inside of an electrical switchgear.

FIG. 4a illustrates a cross sectional view through the second sections 3b of the three terminals 3 viewed front on (although for simplicity, internal details, which are same for all three sections, are illustrated only in one). It can be seen that each housing section 3b has a cross section, in a plane substantially perpendicular to its longitudinal axis (i.e. the axis perpendicular to the plane of the page), that is substantially circular. FIG. 4a shows each housing section 3b with a breaker 4 inserted therein, in the first position.

In this example, each cable contact 6 is a conductive tube or a ring inserted in the housing section 3b and is coaxial with the housing section 3b. The inner radius of each housing section 3b and the outer radius of each cable contact 6 are substantially the same so each cable contact 6 fits snugly in a housing section 3b. Each breaker 4 is generally cylindrical in shape and its first and second 11 contacts (only the second contacts 11 are visible in FIG. 4a) are metal coils each located in a respective annular groove that extends around an external diameter of the breaker 4.

It will be appreciated that the fit between the terminal contacts and the external breaker contacts 11 is such that the breaker 4 can be slid in the housing between the first and second positions.

Although not illustrated, a corresponding cross section through the first sections 3a or the third sections 3c would look the same as that illustrated in FIG. 4a.

As is illustrated, for insulation purposes, a distance x is maintained between adjacent ones of the switching arrangements of the three different phases and between each of the switching arrangements of the two outer phases and ground.

Figure 4B:
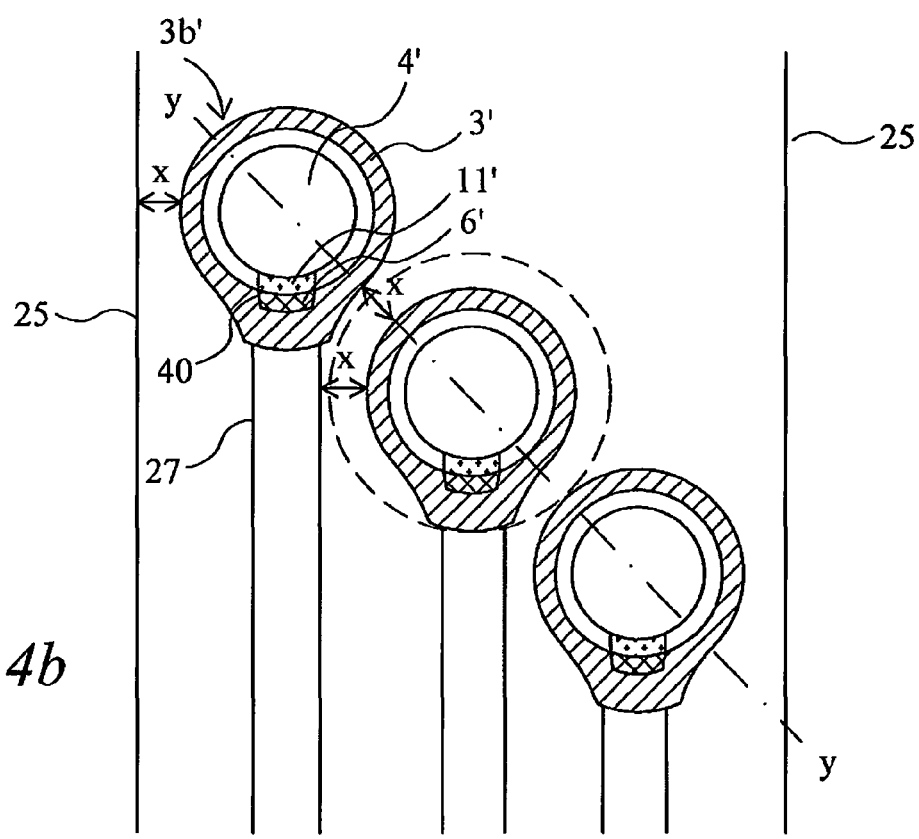
FIG. 4b is a schematic front view of the inside of an electrical switchgear.
Figure 5:
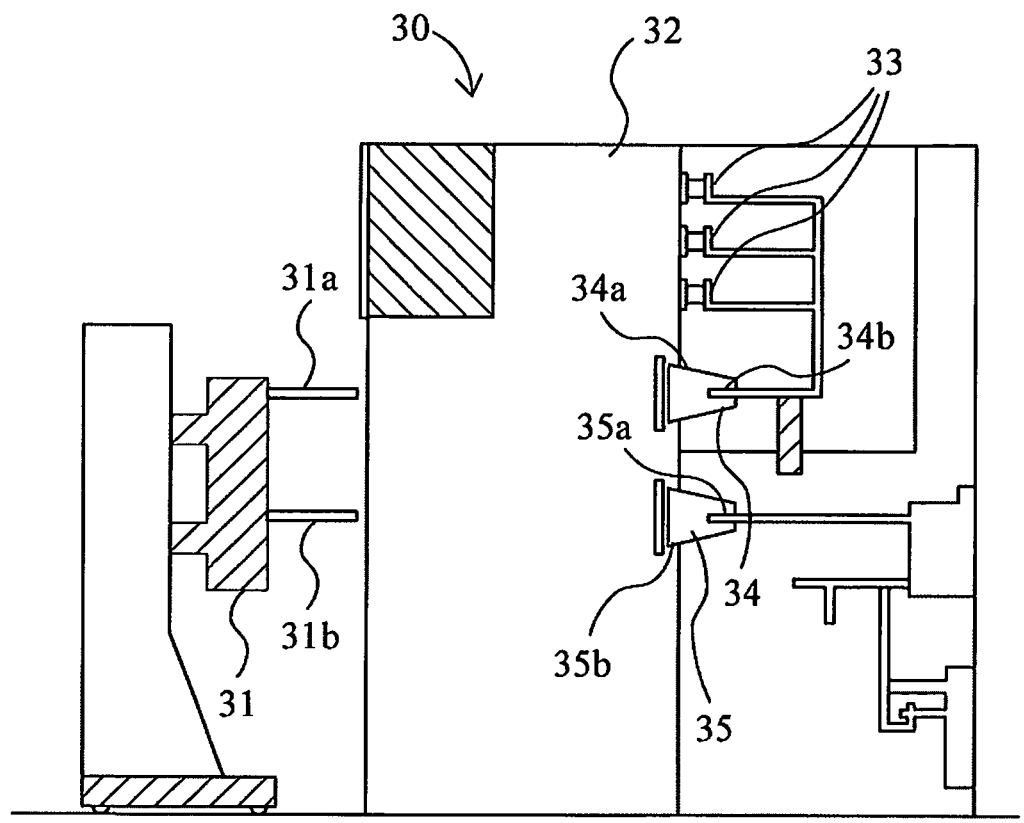
FIG. 5 is a schematic illustration of a known switchgear.

FIG. 4b illustrates a cross section through the second sections 3b' of three terminals 3' viewed front on, in which terminals 3' the terminal contacts are arranged differently to those described above. In this arrangement, each second section 3b' comprises a recess 40 formed in its inner surface and a cable contact 6' is located in the recess 40. The recess 40 and its associated contact 6' extend partially around a circumference of the inner wall, in this example, defining a segment that subtends an angle of approximately 30 degrees with the centre of the second section 3b'.

Although not illustrated, the recess 40 and its contact 7' also extend to some extent along the axial direction of the terminal section 3b. With this arrangement it will be appreciated that each contact 7' is a strip having a slightly curved upper surface that is flush with the inner wall of the second section 3b.

Optionally, the thickness of a second section 3b' may vary around its circumference, being thicker in the region around a contact 7'. This additional thickness increases the rigidity of the section 3b' around the contact. This may be advantageous if for the example the contact 7' is formed of a relatively heavy metal like copper, rather than a lighter metal like aluminium.

In the arrangement shown in FIG. 4b, each second section 3b' has a cross section that is generally oval in shape, although it may instead be circular or indeed some other shape.

Although not illustrated, each terminal 3' comprises first and third sections that correspond with the sections 3a and 3b described above, except that the cross sectional shape of the sections and the arrangement of the terminal contacts therein correspond with the arrangement of FIG. 4b.

Each breaker 4' comprises at its respective ends, first and second 11' external electrical contacts (only the second is illustrated in FIG. 4b), each of which extends partially around the external diameter of the breaker 4' and has a width and length that substantially matches those of the housing contacts.

Locating a terminal contact in a recess formed in the inner wall of the housing means that the diameter of the cavity defined by inner wall can be reduced because it does not need to accommodate the terminal contact. Advantageously, reducing the diameter of the cavity means that the diameter of the terminal can likewise be reduced (over much of the circumference of terminal, if not all of it) which provides for a more compact terminal.

As is illustrated in 4b, the insulation gaps x is again maintained between adjacent ones of the three different phases and between the two outer phases, but because the outer diameter of each housing section is smaller than the outer diameter of each housing section in FIG. 4a, the FIG. 4b arrangement is more compact. For comparison, a dotted line around the middle terminal of FIG. 4b, illustrates the larger external diameter of a terminal having the FIG. 4a arrangement.

In this example, the terminals are arranged substantially in parallel in the switchgear and are spaced apart along a diagonal line Y-Y. This is a particularly space efficient arrangement. However, it should be appreciated that the terminals may also have alternative spatial arrangements, for example, arranged in a horizontal or vertical line and still provide for more space efficient switchgears.

Indeed, a switchgear comprising a single terminal may be made more compact than one also comprising a single terminal but having a traditional circular cross section.

The embodiments of the present invention described above provide for a space efficient switchgear.

Many modifications or variations may be made to the described embodiments without departing from the scope of the claims. For example, although the described terminal housing is in three distinct separate sections, it may instead comprise two distinct sections with one of the contacts, say the bus bar contact 5, in one section, and the other two contacts in the other section. Although in the preferred embodiment the switch arrangement is configured for use in the three positions of FIGS. 2a to 2c, this is not essential. Alternative embodiments may comprise a single operative position (e.g. a service position) or two positions, (e.g. a service position and a withdrawn position, or a service position and a ground position).

Although the drive means is described as being powered it may be manually operated.

The general shape of the housing and of the breaker may of course vary from that described above.

Although in the described embodiment, the switching device 4 is a circuit breaker, it will be appreciated that other breaker devices (i.e. devices that can make or break a circuit when in the first or second positions) may be used, for example, a contactor, a load break switch or an isolation switch.

Further embodiments are described below:

A switch arrangement (1) for an electrical switchgear (2), the switch arrangement (1) comprising: a breaker (4); wherein, the breaker (4) is moveable in the switchgear (2) between a first position and a second position, such that in use, when the breaker (4) is in the first position and closed it electrically connects a bus (8) to a load connection (26), and when the breaker (4) is in the second position and closed it electrically connects the load connection (26) to ground with the bus (8) disconnected from the load connection (26); wherein the breaker (4) moves substantially linearly between the first position and the second position.

A switch arrangement (1), wherein the housing arrangement (3a, 3b, 3c) comprises a hollow electrically insulating member arranged along the axial direction and the electrical contacts comprise electrically conductive regions in the member.

A switch arrangement as described herein wherein the breaker (4) is separable from the terminal assembly (3).

Electrical switchgear comprising a multi phase system, and for each phase a switch arrangement as described herein.

A method of operating the switch arrangement as described herein, the method comprising moving the breaker substantially linearly between the first position and the second position.

The invention claimed is:

1. A switch arrangement for an electrical switchgear, the switch arrangement comprising:
   a terminal arrangement comprising an insulating housing, the insulating housing comprising a first electrical contact and a second electrical contact which are spaced apart from each other along an axial direction; and
   a breaker moveable along the axial direction in the housing to a first position;
   wherein, when the breaker is in the first position and closed it electrically connects the first electrical contact and the second electrical contact;
   wherein the insulating housing is split into a plurality of separate sections which are spaced apart from each other along the axial direction so as to provide a gap between adjacent separate sections allowing access to inside of the housing; and
   wherein at least one of the electrical contacts is in a first section of the sections and at least another of the electrical contacts is in a second section of the sections.

2. The switch arrangement according to claim 1, wherein the breaker is moveable to a second position in which it is withdrawn from the switchgear.

3. The switch arrangement according to claim 1, wherein the first electrical contact is for a bus and the second electrical contact is for a load connection.

4. The switch arrangement according to claim 3, wherein the insulating housing comprises a third electrical contact spaced apart from the first electrical contact and the second electrical contact along the axial direction;
   wherein, the third electrical contact is for a ground;
   wherein the breaker is moveable to a third position; and
   wherein, when the breaker is in the third position and closed it electrically connects the second electrical contact and the third electrical contact, and the first electrical contact is isolated.

5. The switch arrangement according to claim 4, wherein the insulating housing is split into three separate sections along the axial direction, and wherein the third electrical contact is in the third section.

6. The switch arrangement according to claim 1, wherein the electrical contacts comprise electrically conductive regions at an inner surface of the housing.

7. The switch arrangement according to claim 1 wherein the breaker comprises a first breaker electrical contact and a second breaker electrical contact, with the first breaker electrical contact engaging the first electrical contact and the second breaker electrical contact engaging the second electrical contact in the first position.

8. The switch arrangement according to claim 4, wherein the breaker comprises a first breaker electrical contact and a second breaker electrical contact, with the first breaker electrical contact engaging the first electrical contact and the second breaker electrical contact engaging the second electrical contact in the first position; and
   wherein, in the third position, the first breaker electrical contact engages the second electrical contact for the load connection and the second breaker electrical contact engages the third electrical contact.

9. The switch arrangement according to claim 1, further comprising a drive mechanism for driving the breaker into the first position.

10. The switch arrangement according to claim 1, wherein the insulating housing has an inner surface defining a cavity in which the breaker is moveable along the axial direction; and the first electrical contact is located in a first recess formed in the inner surface and the second electrical contact is located in a second recess formed in the inner surface.

11. The switch arrangement according to claim 10, wherein any of the electrical contacts are flush with the inner surface of the insulating housing.

12. The switch arrangement according to claim 10, wherein the insulating housing comprises a cross section, in a plane substantially perpendicular to the axial direction, that is substantially oval shaped.

13. An electrical switchgear comprising at least one switch arrangement, the switch arrangement comprising:
   a terminal arrangement comprising an insulating housing, the insulating housing comprising a first electrical contact and a second electrical contact which are spaced apart from each other along an axial direction; and
   a breaker moveable along the axial direction in the housing to a first position;

wherein, when the breaker is in the first position and closed it electrically connects the first electrical contact and the second electrical contact;

wherein the insulating housing is split into a plurality of separate sections which are spaced apart from each other along the axial direction so as to provide a gap between adjacent separate sections access to inside of the housing; and wherein at least one of the electrical contacts is in a first section of the sections and at least another of the electrical contacts is in a second section of the sections.

14. The electrical switchgear according to claim 13, comprising a plurality of switch arrangements which are arranged substantially in parallel in the switchgear.

15. The electrical switchgear according to claim 14, wherein the plurality of switch arrangements are arranged diagonally in the switchgear.

* * * * *